United States Patent
Suzuki (12)

(10) Patent No.: US 6,231,631 B1
(45) Date of Patent: May 15, 2001

(54) COMPOST EXCELLENT IN FERTILIZING ACTIVITY AND PRODUCTION METHOD THEREOF

(75) Inventor: Kazuyoshi Suzuki, Kawasaki (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/052,094

(22) Filed: Mar. 31, 1998

(30) Foreign Application Priority Data

Apr. 7, 1997 (JP) .................................................... 9-103815

(51) Int. Cl.⁷ .............................. C05F 11/00; C05R 17/00
(52) U.S. Cl. ........................................ 71/13; 71/9; 71/23
(58) Field of Search .............................. 71/9, 11, 12, 23, 71/901, 10, 13; 435/41

(56) References Cited

U.S. PATENT DOCUMENTS

| | | | |
|---|---|---|---|
| 4,203,376 | * 5/1980 | Hood | 110/346 |
| 4,971,616 | * 11/1990 | Glogowski | 71/9 |
| 5,057,141 | * 10/1991 | Rodriguez-Kabana et al. | 71/28 |
| 5,100,455 | * 3/1992 | Pinckard et al. | 71/9 |
| 5,169,782 | * 12/1992 | Murphy et al. | 435/312 |
| 5,534,437 | * 7/1996 | Arrau | 435/290.3 |
| 5,538,860 | * 7/1996 | Castelli | 435/41 |

FOREIGN PATENT DOCUMENTS

| | | | |
|---|---|---|---|
| 3439720 | * 5/1986 | (DE) | 71/9 |
| 445102 | * 9/1991 | (EP) | 71/9 |

OTHER PUBLICATIONS

Rao, N., "Effect of C/N Ratio and Moisture Content on the Composting of Poplar Wood", p889–92, Aug. 1995.*

Rodale, J.I., "The Complete Book of Composting", pp. 701–702, Aug. 1975.*

* cited by examiner

Primary Examiner—Gary P. Straub
(74) Attorney, Agent, or Firm—Frishauf, Holtz, Goodman, Langer & Chick, P.C.

(57) ABSTRACT

Compost of the present invention has a weight ratio (C/N) of carbon (C) to nitrogen (N) of 9.5 or less on completion of a compost treatment. Further, a method of the present invention for producing the compost comprises the steps of providing a compost material having the weight ratio (C/N) of carbon (C) to nitrogen (N) of 10.5 or less, and carrying out the compost treatment of the compost material by maintaining water content thereof substantially at 30–60%. Thus, the present invention provides the compost excellent in fertilizing activity and the production method thereof.

15 Claims, No Drawings

COMPOST EXCELLENT IN FERTILIZING ACTIVITY AND PRODUCTION METHOD THEREOF

BACKGROUND OF THE INVENTION

1. Field of the Invention

The present invention relates to compost excellent in fertilizing activity, and to its production. The present invention can be applied for treating particularly agricultural waste, for example, organic waste rich in vegetable scrap or the like dumped from fruit and vegetable markets and for producing therefrom compost excellent in fertilizing activity.

2. Description of the Related Art

Organic waste such as urban rubbish (such as kitchen waste), sewage sludge, excreta from stock raising, and trash from agricultural production can be converted under appropriate conditions (for example in the presence of microorganisms) into compost which is then recycled to soil for reuse as fertilizer.

As for some organic wastes treated in compost treating equipment, although there are cases where organic wastes are masses consisting of various organic substances such as urban rubbish, there are not a few cases where composition of the wastes is comparatively homogeneous such as sewage sludge, excreta from stock raising, trash from fruit and vegetable markets, or waste from fish markets. For such waste composed of organic substances comparatively homogenous in composition to be treated to produce compost, certain appropriate conditions exist or likely exist which can be chosen according to the composition of those organic substances or the property of a resulting mass.

For example, it is a feature that agricultural waste, particularly garbage damped from fruit and vegetable markets contains a rich amount of vegetable scrap, and hence it has a high carbon/nitrogen ratio (C/N ratio) and fiber content as compared with kitchen waste, sewage sludge, and excreta from stock raising, though of course not as high as those of sawdust or timber tips.

Generally, many studies have been reported heretofore as regards the methods how to treat organic wastes to produce compost. Some items such as water content, porosity, pH, and C/N ratio of a material to be turned into compost are proposed to be considered in the compost treatment. The carbon/nitrogen ratio of a compost material has been known as a factor which may greatly affect the rate at which the material is converted into a finished compost, and it is generally said that, with a material having a carbon/nitrogen ratio of 7–30, decomposition of organic substances takes place rapidly, and with a material having a carbon/nitrogen ratio of 7–10, organic substances decompose most rapidly. Also it has been known that the carbon/nitrogen ratio is 30–50 for common urban rubbish, 8–12 for sewage sludge, and about 10–20 for product compost which has received a compost treatment.

Further, according to the description of Japanese Unexamined Patent Publication No. 57-11895, it is described that sufficiently ripe compost can be produced in a short time when a compost material which meets the conditions such as a carbon/nitrogen ratio of 12–25 and a water content of 60–85% is treated under a certain air supply condition. Furthermore, in Japanese Unexamined Patent Publication No. 61-97181, is described a method that organic compost fermented and dried in a short period can be obtained by controlling air evacuation from a sealed type fermentation tank to which warm air is ventilated, and it is also described that a compost material should preferably have a carbon/nitrogen ratio of 10–20 and a water content of 50–70%.

As described above, of compost materials and particularly compost having received a compost treatment, with a carbon/nitrogen ratio of 10 or less, discussion has been seldom made with an emphasis on their quality.

According to what the present inventors have found, even if garbage dumped from fruit and vegetable markets, to be made into compost, is initially so adjusted as to have a carbon/nitrogen ratio of 12–25 during a preparation stage, then receives an appropriate compost treatment, and thus obtained compost has a carbon/nitrogen ratio of 10–20, the resulting compost, when applied to soil to see its fertilizing effect, will not give a result as expected. Briefly, they found that this method can not provide compost excellent in fertilizing activity.

SUMMARY OF THE INVENTION

It is an object of the present invention to provide compost excellent in fertilizing activity, and a production method thereof, particularly a method whereby organic waste rich in vegetable scrap such as garbage dumped from fruit and vegetable markets is treated so as to produce compost.

To achieve the object, the present invention provides compost which has a weight ratio (C/N) of carbon (C) to nitrogen (N) of 9.5 or less on completion of a compost treatment.

Further, the present invention relates to a method for producing compost, which comprises the steps of providing a compost material having a weight ratio (C/N) of carbon (C) to nitrogen (N) of 10.5 or less and carrying out a compost treatment of the compost material by maintaining a water content of the compost material substantially at 30–60%. The weight ratio (C/N) of carbon (C) to nitrogen (N) of the compost material can be adjusted by adding or lessening organic waste appropriately. When necessary, prior to the compost treatment, the water content of the compost material should be adjusted by adding moisture to or drying the compost material appropriately. For uniformity of a compost material, the compost material is dried until it has a water content of 10–30%, and then its water content is adjusted.

Further, the present invention relates to a method for using compost, which comprises the step of applying the compost to soil for cultivation, wherein the compost has a weight ratio (C/N) of carbon (C) to nitrogen (N) of 9.5 or less on completion of a compost treatment.

In this specification, the weight ratio (C/N) of carbon (C) to nitrogen (N) (hereinafter referred to, in some cases, simply as "carbon/nitrogen ratio") refers to a ratio of carbon weight against nitrogen weight which is obtained after respective weights have been derived from a material of interest and the ratio thereof calculated. Specifically, from a material of interest is extracted a sample which is sufficient in weight to give a significant result, and the sample is submitted to a general carbon assay (as described in JIS-M-8813) and a general nitrogen assay (as described in JIS-M-8813), and the ratio in question is calculated from the measurements.

DESCRIPTION OF THE EMBODIMENT

The compost of the present invention has a carbon/nitrogen ratio of 9.5 or less after completion of a compost treatment and preferably 8.5 or less. According to what the present inventors have found, when compost has a carbon/nitrogen ratio exceeding 9.5, its fertilizing activity is lowered because it, when applied to soil, deprives the soil of nitrogen content and gives adverse effects to crops cultivated there. Particularly, as is evident from the description of examples given later, when compost prepared from garbage discharged from fruit and vegetable markets has a nitrogen/carbon ratio exceeding 9.5, its fertilizing activity is greatly lowered. When the compost has a nitrogen/carbon ratio of 9.5 or less, its fertilizing activity is improved, and when the compost has a nitrogen/carbon ratio of 8.5 or less, its fertilizing activity becomes excellent.

In this specification, "a compost treatment" refers to a process wherein organic materials (particularly organic waste) are processed to compost through the action of microorganisms. For example, this treatment can be carried out by leaving organic materials (particularly organic waste) to an aerobic fermentation, while preferably subjecting them to appropriate ventilating and stirring conditions for a certain period. Here, "organic materials" mean organic compounds which are liable to chemical processing through the action of microorganisms, and preferably biodegradable organic materials, i.e. organic compounds without non-biodegradable materials such as plastics.

The compost treatment is not necessarily limited to what follows, but it generally proceeds in a fermentation tank which can store a large volume of organic materials over a certain period. This fermentation tank is preferably capable of fermenting organic materials rapidly, has a small installation area for the tank, and thus scarcely generates a secondary public nuisance such as a bad smell. As regards such tanks, various variants have been proposed. For example, according to a multi-stage, cylindrical compost producing system as described in Japanese Examined Patent Publication No. 61-36622, the compost treatment is done as follows: a multi-layered cylindrical fermentation tank with a stack of cylindrical fermentation tanks is implemented where rotatory paddles rotate at a low speed about a central pillar as a rotation axis and, at the same time spin practically normal to the floors, and horizontal beds are so arranged as to supply ventilating air; organic materials (particularly organic waste) are introduced from a material feeding port on the top cylindrical fermentation tank, the materials are stirred with the stirring paddles, and carried down one cylindrical fermentation tank after another in order until they reach the lowest cylindrical fermentation tank where they are taken out; during this process, they undergo fermentation and receives a compost treatment.

Whether compost treatment is sufficiently made or not can be checked, for example, by the method as described in the proceeding for the Seventh Meeting of Japan Society of Waste Management Experts, pp. 317–319 (October 1996) which is used to determine the ripeness of given compost. Namely, during a compost treatment, from a compost material are extracted samples at intervals, each of which is sufficient in weight to give a significant result, and each sample is dissolved in a specified volume of water to produce a suspension. Solid components are removed, and the liquid phase has its light absorption (to light having a wavelength chosen as appropriate from the range of 700–400 nm) assayed, and the results are plotted to see when a plateau is reached. A time when the measurements stop rising can be taken as the time when the compost process has completed.

The above-described compost according to the present invention is prepared by the method of the present invention.

The method of the present invention comprises using a compost material having a carbon/nitrogen ratio of 10.5 or less, more preferably 9.8 or less, and subjecting it to a compost treatment while maintaining its water content substantially at 30–60%, or more preferably 35–50%

The compost material to be treated by the method of the present invention is not limited to any specific material as long as it has a carbon/nitrogen ratio of 10.5 or less, and may include, for example, organic waste such as urban rubbish (e.g., kitchen waste), sewage sludge, excreta from stock raising, and/or agricultural waste. Particularly, agricultural waste mainly composed of vegetable scrap, fruit scrap such as garbage from fruit and vegetable markets is preferred.

If an agricultural waste (for example, garbage from fruit and vegetable markets) has a carbon/nitrogen ratio exceeding 10.5, organic substances (particularly organic waste) having a low carbon/nitrogen ratio is added thereto to adjust the carbon/nitrogen ratio of resulting material to 10.5 or less. Such organic substances as having a low carbon/nitrogen ratio include, for example, sewage sludge (dehydrated cakes), chicken manure, scraps from restaurants, etc. but are not limited to any specific organic substance if those do not prevent compost process.

If a compost material has a carbon/nitrogen ratio exceeding 10.5, the compost obtained after the material has been subjected to the compost treatment will scarcely give a carbon/nitrogen ratio of 9.5 or less, and thus an excellent fertilizing activity. The lower limit of carbon/nitrogen ratio is about 8 for sewage sludge used as a ratio adjuster, while it is about 7.5 for chicken manure used for the same purpose. Thus, as for agricultural waste (for example, garbage from fruit and vegetable markets) which is preferably used as a compost material for the method of the present invention, the lower limit of carbon/nitrogen ratio for a compost material is about 7.5 at the least.

With the method of the present invention, water content of an organic material to be used as a compost material is adjusted to 30–60 weight % prior to the compost treatment, in order to substantially maintain the water content of compost material at 30–60 weight % during the compost treatment.

When the material has a water content over 60 weight %, it is possible to adjust the water content thereof to 30–60 weight %, for example, by subjecting the material to a drying treatment (for example, by natural drying with spontaneous vaporization or by a forced drying), by adding thereto dried organic substances (for example, hay, straw, husks, or timber tips), etc.

To adjust water content of a compost material to 30–60 weight %, it is desirable to dry the compost material in advance until it has a water content of 10–30 weight %, and then to adjust its water content to 30–60 weight %. This is because drying the compost material until it has the water content of 10–30 weight % contributes to pulverization of coarse substances contained in the compost material, and to uniformity in size of particles and/or quality of the compost material. The compost material, after having been subjected to the drying process, may be sifted by being passed through a sieve with an appropriate mesh size (for example, 10–20 mm) to remove substances which will not become compost.

When the compost material has a water content lower than 30 weight %, it is possible to adjust its water content to 30–60 weight %, for example, by adding water thereto, or by drying it until it has a water content not below 10 weight % and then adjusting it to 30–60 weight %.

With the present invention, a compost material is subjected to a compost treatment while its water content is controlled so as to be substantially 30–60 weight %.

Namely, with the present invention, while carrying out the compost treatment, i.e. from the start of the compost treatment to its completion, the water content of the compost material is maintained substantially at 30–60 weight %. During the compost treatment, heat is generated as a result of fermentation. Moreover, owing to ventilation and stirring generally employed, the water content of the compost material becomes low unless waster is added in the middle of process. With the present invention, it is possible to maintain the water content of a compost material substantially at 30–60 weight % by adding water during process. A method to add water to a compost material is not limited to what follows, but, for example, a method of adding water as a liquid or a spray to the compost material or a method of exposing the compost material to a gas for humidification may be employed.

How much and how often water should be added to the compost material can be determined as appropriate, for example, after samples have been extracted from the compost material and their water content measured. Alternatively, a pilot test may be performed to determine in advance how much and how often water is added to the compost material.

With the present invention, while a compost material is being treated, its water content is maintained "substantially" at 30–60 weight %. In this specification, a compost material is judged to have "a water content maintained substantially at 30–60 weight %" even when the water content of the compost material is out of the range of 30–60 weight %, as long as the water content can be taken as representative of a temporary or local variation when compared with the total time required for the compost treatment and with the total mass of the compost material subjected to the compost treatment.

For example, the compost treatment is generally carried out by using a large fermentation tank, and it is sometimes difficult to maintain water content of the compost material at 30–60 weight % evenly all through the fermentation tank. In such case, if water is added as a liquid to the compost material, the compost material might have a water content exceeding locally 60 weight % though just a short period (for example 30 minutes or less). If there are some sites in the tank which have higher temperatures than others (for example, sites where fermentation takes place more actively, or sites which are more close to a heating means when such heating means is employed), drying will proceed more rapidly there, and thus the compost material there might have a water content below 30 weight %. As discussed above, even in a case a compost material has a water content out of the range of 30–60 weight % during a compost treatment, as long as the too moist or too dry state is judged to be local or temporal as compared with the total time required for the compost treatment or with the total mass subjected to the compost treatment, it can be regarded as having water content maintained substantially at 30–60 weight %, and the case can be included in the present invention.

When a compost material is allowed to have a water content of 30–60 weight % and water is supplemented to the material by the amount of water loss during a compost treatment, the compost treatment proceeds satisfactorily since an environment ("presence of an appropriate amount of water" and "appropriately maintained ventilation") is maintained which is suitable for the existence of aerobic microorganisms which play a central role during the compost treatment.

If a compost material has a water content below 30 weight %, the "presence of an appropriate amount of water" is not ensured. Thus, the activity of aerobic microorganisms declines and the compost treatment does not proceed successfully.

If a composition has a water content over 60 weight %, the material will become a semi-solid mass, and give an anaerobic environment. Accordingly, the "appropriately maintained ventilation" is not ensured, and the activity of aerobic microorganisms also declines, and the treatment does not proceed successfully.

Further, even if a compost material has a water content of 30–60 weight % initially, its water content will be less than 30 weight % unless water loss is compensated. Then, the "presence of an appropriate amount of water" is not ensured and the activity of aerobic microorganisms declines, and the treatment will not proceed successfully.

When a compost material is dried until it has a water content of 10–30 weight %, coarse matters in the compost material are pulverized, which will contribute to uniformity in size of particles and/or quality of the compost material. When water is added to the material in this state, uneven distribution of moisture in the material is avoided and fermentation proceeds evenly, and thus a satisfactory compost treatment may result.

In addition, as the compost material has a carbon/nitrogen ratio of 10.5 or less, the resulting compost will have a carbon/nitrogen ratio of 9.5 or less, which ensures an excellent fertilizing activity.

EXAMPLES

The present invention will be illustrated below by means of examples, but these examples are not mentioned below to limit the scope of the present invention. In examples described below, carbon and nitrogen contents were measured according to the method described in JIS-M-8813 and the carbon/nitrogen ratio was calculated. Three measurements for each element were performed for each sample and the measurements were averaged.

Examples 1–7 and Comparative Examples 1–3

Garbage discharged from fruit and vegetable markets and mainly composed of vegetable scrap was put in a large vertical indirect steam drier and dried to a water content of 45% by allowing the garbage to stay there at about 80° C. for two hours. The resultant mass was determined of its carbon/nitrogen ratio which was 12.5. Also scraps from restaurants, to be used as an adjuster of carbon/nitrogen ratio, was poured into a large drier to subject it to the same treatment. Then, the resulting mass was dried so as to have a water content of 45%, and at this state the carbon/nitrogen ratio was 7.9.

The above-described dried garbage mainly composed of vegetable scrap (C/N ratio=12.5) and the above-described dried scraps from restaurants (C/N ratio=7.9) were mixed together so as to prepare nine kinds of compost materials whose carbon/nitrogen ratios increase in an ascending order from 7.9 to 12.5, i.e. a compost material having a carbon/nitrogen ratio of 7.9 (example 1), a compost material having a carbon/nitrogen ratio of 8.5 (example 2), a compost material having a carbon/nitrogen ratio of 9.0 (example 3), a compost material having a carbon/nitrogen ratio of 9.5 (example 4), a compost material having a carbon/nitrogen ratio of 9.8 (example 5), a compost material having a carbon/nitrogen ratio of 10.0 (example 6), and a compost material having a carbon/nitrogen ratio of 10.5 (example 7), also a compost material having a carbon/nitrogen ratio of 11.0 (comparative example 1) and a compost material having a carbon/nitrogen ratio of 12.5 (comparative example 2) were prepared.

Each of the compost materials having a volume of 40 liters was poured into an experimental compost producing apparatus (50 liters), and the apparatus was ventilated by air which flowed through the apparatus at a rate of 0.33 liter/min for one kilogram of compost material. Once daily, a cut was done by turning the compost material up on a vinyl sheet. Further, in order to keep the water content of fermenting mass at 40–45%, water was added as appropriate to compensate for water loss occurring as a result of vaporization. Such compost treatments were allowed to continue for forty days. The resulting compost was measured of its carbon/nitrogen ratio, and the compost material (C/N ratio= 7.9) of example 1 produced compost whose C/N ratio is 6.7, the compost material (C/N ratio=8.5) of example 2 produced compost whose C/N ratio is 7.1, the compost material (C/N ratio=9.0) of example 3 produced compost whose C/N ratio is 8.0, the compost material (C/N ratio =9.5) of example 4 produced compost whose C/N ratio is 8.2, the compost material (C/N ratio=9.8) of example 5 produced compost whose C/N ratio is 8.5, the compost material (C/N ratio =10.0) of example 6 produced compost whose C/N ratio is 9.0, and the compost material (C/N ratio=10.5) of example 7 produced compost whose C/N ratio is 9.5, also the compost material (C/N ratio=11.0) of comparative example 1 produced compost whose C/N ratio is 9.6 and the compost material (C/N ratio=12.5) of comparative example 2 produced compost whose C/N ratio is 10.2.

The thus obtained compost was evaluated for its fertilization activity through the following plant growth test (soil fertilization test):

5 grams sample was extracted from each of the compost produced in examples 1 to 7 and in comparative examples 1 and 2, was applied to 2 kilograms of commercially available black soil for general horticulture purposes, and left for one week. Then the soil was transferred to a 1/5000a Wagner pot, which was sowed with 20 grains of Chinese cabbage seeds. One week later, weak sprouts were removed to leave five robust shoots per pot. These young vegetables were allowed to grow for further 40 days, and cropped. The thus obtained five vegetables were separately weighed (totaling leaves and stems on the ground and roots under the ground), and their weights summed to give a growth amount (g).

As a control (comparative example 3), the same vegetable was grown in the same manner except that the same commercially available black soil alone was used for cultivation without being supplemented with compost.

The results of the plant growth test are shown in Table 1.

TABLE 1

|  | C/N Ratio of Material | C/N Ratio of Compost | Growth Amount (g) |
|---|---|---|---|
| Example 1 | 7.9 | 6.7 | 57.2 |
| Example 2 | 8.5 | 7.1 | 61.3 |
| Example 3 | 9.0 | 8.0 | 59.5 |
| Example 4 | 9.5 | 8.2 | 62.1 |
| Example 5 | 9.8 | 8.5 | 55.2 |
| Example 6 | 10.0 | 9.0 | 33.5 |
| Example 7 | 10.5 | 9.5 | 21.2 |
| Comparative Example 1 | 11.0 | 9.6 | 17.7 |
| Comparative Example 2 | 12.5 | 10.2 | 9.5 |

TABLE 1-continued

|  | C/N Ratio of Material | C/N Ratio of Compost | Growth Amount (g) |
|---|---|---|---|
| Comparative Example 3 | — | — | 15.9 |

As is evident from the above, the compost whose carbon/nitrogen ratio is 9.5 or less gave good results in the plant growth test. Further, when a compost material is so adjusted in advance as to have a carbon/nitrogen ratio of 10.5 or less and is then submitted to the compost treatment, the resulting compost will give good results in the plant growth test.

Examples 8–13 and Comparative Examples 4–6

The above-described garbage from fruit and vegetable markets (C/N ratio=12.5) and the above-described scraps from restaurants (C/N ratio=7.9) were mixed to produce two kinds of garbage whose carbon/nitrogen ratios were 9.5 and 10.5 respectively. Then, these two kinds of garbage mixture were dried with a large vertical indirect steam drier which dries the contents until they had certain predetermined water contents. Thus, from the garbage mixture with a carbon/nitrogen ratio of 9.5 were prepared different compost materials whose water contents were 20%, 30%, 40%, 50%, 60%, and 70%, while from the garbage mixture with a carbon/nitrogen ratio of 10.5 were prepared compost materials whose water contents were 30%, 60%, and 70%. Namely, prepared were a compost material whose carbon/nitrogen ratio is 9.5 and water content 20% (comparative example 4), a compost material whose carbon/ nitrogen ratio is 9.5 and water content 30% (example 8), a compost material whose carbon/nitrogen ratio is 9.5 and water content 40% (example 9), a compost material whose carbon/nitrogen ratio is 9.5 and water content 50% (example 10), a compost material whose carbon/nitrogen ratio is 9.5 and water content 60% (example 11), and a compost material whose carbon/nitrogen ratio is 9.5 and water content 70% (comparative example 5), also a compost material whose carbon/nitrogen ratio is 10.5 and water content 30% (example 12), a compost material whose carbon/nitrogen ratio is 10.5 and water content 60% (example 13), and a compost material whose carbon/nitrogen ratio is 10.5 and water content 70% (comparative example 6).

Each of the aforementioned compost materials having a volume of 40 liters was poured into an experimental compost producing apparatus (50 liters), and the apparatus was ventilated by air which flowed through the apparatus at a rate of 0.33 liter/min for every one kilogram of compost material. Once daily, a cut was done by turning the compost material up on a vinyl sheet. Further, in order to keep the water content of fermenting mass at the initially determined level, water was added as appropriate to compensate for water loss occurring as a result of vaporization. Such compost treatments were allowed to continue for forty days. The resulting compost was measured of its carbon/nitrogen ratio, and the compost material (C/N ratio of 9.5 and water content 20%) of comparative example 4 produced compost whose C/N ratio is 9.5. In the same manner, the compost material (C/N ratio of 9.5 and water content 30%) of example 8 produced compost whose C/N ratio is 8.3, the compost material (C/N ratio of 9.5 and water content 40%) of example 9 produced compost whose C/N ratio is 8.1, the compost material (C/N ratio of 9.5 and water content 50%) of example 10 produced compost whose C/N ratio is 8.2, the compost material (C/N ratio of 9.5 and water content 60%) of example 11 produced compost whose C/N ratio is 8.7, and the compost material (C/N ratio of 9.5 and water content 70%) of comparative example 5 produced compost whose C/N ratio is 9.4, also the compost material (C/N ratio of 10.5 and water content 30%) of example 12 produced compost whose C/N ratio is 9.4, the compost material of (C/N ratio of 10.5 and water content 60%) of example 13 produced compost whose C/N ratio is 9.6, and the compost material (C/N ratio of 10.5 and water content 70%) of comparative example 6 produced compost whose C/N ratio is 10.4. The thus obtained compost was evaluated for its fertilizing activity in the same way as applied to the foregoing examples through the plant growth test. The test results are shown in

TABLE 2

|  | C/N Ratio of Material | Water Content (%) | C/N Ratio of Compost | Growth Amount (g) |
| --- | --- | --- | --- | --- |
| Comparative Example 4 | 9.5 | 20 | 9.5 | 19.8 |
| Example 8 | 9.5 | 30 | 8.3 | 61.2 |
| Example 9 | 9.5 | 40 | 8.1 | 60.5 |
| Example 10 | 9.5 | 50 | 8.2 | 62.5 |
| Example 11 | 9.5 | 60 | 8.7 | 43.5 |
| Comparative Example 5 | 9.5 | 70 | 9.4 | 18.6 |
| Example 12 | 10.5 | 30 | 9.4 | 19.2 |
| Example 13 | 10.5 | 60 | 9.6 | 17.8 |
| Comparative Example 6 | 10.5 | 70 | 10.4 | 9.7 |

As seen from the above, the compost which has been produced from the mixed garbage having a water content of 30–60% gives a good fertilizing activity in the plant growth test.

Examples 14 and 15

The above-described garbage from fruit and vegetable markets (C/N ratio=12.5) and the above-described scraps from restaurants (C/N ratio=7.9) were mixed to prepare mixed garbage having a carbon/nitrogen ratio of 9.5. Then, the mixed garbage was put in a large vertical indirect steam drier which forcibly dried the content until it has a water content of 12% or 25%. Then, water was added to those forcibly dried mixed garbage having a water content of 12% or 25% to adjust their water contents to 35% and 40% respectively, and the two were used as compost materials (examples 14 and 15).

Each of the compost materials having a volume of 40 liters was poured into an experimental compost producing apparatus (50 liters), and the apparatus was ventilated by air which flowed through the apparatus at a rate of 0.33 liter/min for every one kilogram of compost material. Once daily, a cut was done by turning the compost material up on a vinyl sheet. Further, in order to keep the water content of fermenting mass at a level initially set, water was added as appropriate to compensate for water loss occurring as a result of vaporization. Such compost treatments were allowed to continue for forty days. The resulting compost was measured of its carbon/nitrogen ratio, and the compost material (C/N ratio of 9.5 and a water content of 35%, adjusted after forced drying until a water content of 12%) of example 14 produced compost whose C/N ratio is 8.0, while the compost material (C/N ratio of 9.5 and a water content of 40%, after forced drying until a water content of 25%) of example 15 produced compost whose C/N ratio is 8.1.

The thus obtained compost was evaluated for its fertilizing activity in the same way as applied to the foregoing examples through the plant growth test. The test results are shown in Table 3.

TABLE 3

|  | C/N Ratio of Material | Water Content after Drying (%) | Water Content after Adjustment (%) | C/N Ratio of Compost | Growth Amount (g) |
| --- | --- | --- | --- | --- | --- |
| Example 14 | 9.5 | 12 | 35 | 8.0 | 64.1 |
| Example 15 | 9.5 | 25 | 40 | 8.1 | 63.2 |

As seen from the above, the garbage preparation whose water content had been forcibly reduced to 12–25% underwent, when later having its water content adjusted as appropriate, a successful ripening to become compost. The thus obtained compost gives a satisfactory result when applied to soil and tested for its fertilizing activity.

According to the present invention, compost excellent in fertilizing activity can be provided. Also, according to the method of the present invention, it is possible to produce compost which has a low carbon/nitrogen ratio and is excellent in fertilizing crops.

What is claimed is:

1. A method for producing compost having fertilizing activity from high ratio compost material having a weight ratio (C/N) of carbon (C) to nitrogen (N) of greater than 10.5, comprising the steps of:

adding low ratio compost material having a weight ratio (C/N) of carbon (C) to nitrogen (N) of less than 10.5 to the high ratio compost material to form a mixed compost with a weight ratio (C/N) of 10.5 or less; and carrying out a compost treatment of the mixed compost material by maintaining water content of the compost material, to produce a compost having a weight ratio (C/N) of carbon (C) and nitrogen (N) of 9.5 or less on completion of the compost treatment.

2. A method according to claim 1, wherein the step of carrying out the compost treatment includes the step of:

maintaining the water content of the mixed compost material substantially at 30–60%.

3. A method according to claim 1, wherein the water content of the compost material is maintained by at least one method selected from the group consisting of a method of adding water as a liquid to the mixed compost material and a method of exposing the mixed compost material to a gas for humidification.

4. The method of claim 3, wherein the water content of the compost mixture is maintained by adding water as a liquid in the form of a spray.

5. A method according to claim 1, further comprising the step of:

adjusting the water content of the mixed compost material to 30–60% in advance of the compost treatment.

6. A method according to claim 5, wherein the water content of the mixed compost material is adjusted by at least one method selected from the group consisting of a method of adding water as a liquid to the mixed compost material and a method of exposing the mixed compost material to a gas for humidification.

7. The method of claim 6, wherein the water content of the compost mixture is maintained by adding water as a liquid in the form of a spray.

8. A method according to claim 5, wherein the water content of the mixed compost material is adjusted by using at least one selected from the group consisting of natural drying, a dry organic material, and an indirect dryer.

9. A method according to claim 5, further including the step of:

drying the mixed compost material until the water content falls to 10–30% in advance of adjusting the water content of the mixed compost material.

10. A method according to claim 9, further including the step of:

sifting the mixed compost material after drying the compost material.

11. A method according to claim 1, wherein the low ratio compost material is at least one selected from the group consisting of sewage sludge (dehydrated cakes), chicken manure and scraps from restaurants.

12. A method according to claim 11, wherein the high ratio compost material is agricultural waste with a C/N ratio exceeding 10.5.

13. The method according to claim 12, wherein the low ratio compost material is chicken manure.

14. A method according to claim 12, wherein the low ratio compost material is sewage sludge.

15. A method for fertilizing comprising the steps of:

adding low ratio compost material having a weight ratio (C/N) of carbon (C) to nitrogen (N) of less than 10.5 to the high ratio compost material to form a mixed compost with a weight ratio (C/N) of 10.5 or less;

carrying out a compost treatment of the mixed compost material by maintaining water content of the compost material, to produce a compost having a weight ratio (C/N) of carbon (C) and nitrogen (N) of 9.5 or less on completion of the compost treatment; and applying the compost to soil for cultivation.

* * * * *